United States Patent [19]

Edwards, Jr. et al.

[11] 4,371,963

[45] Feb. 1, 1983

[54] METHOD AND APPARATUS FOR DETECTING AND CORRECTING ERRORS IN A MEMORY

[75] Inventors: Gordon L. Edwards, Jr., Easley, S.C.; Walter A. Smith, Kettering, Ohio

[73] Assignee: NCR Corporation, Dayton, Ohio

[21] Appl. No.: 220,221

[22] Filed: Dec. 24, 1980

[51] Int. Cl.³ ............................................. G06F 11/10
[52] U.S. Cl. ........................................ 371/50; 371/51
[58] Field of Search ....................... 371/50, 51, 38, 21

[56] References Cited

U.S. PATENT DOCUMENTS

| | | | |
|---|---|---|---|
| 3,063,636 | 11/1962 | Sierra | 235/153 |
| 3,183,483 | 5/1965 | Lisowski | 371/50 |
| 3,200,374 | 8/1965 | Ballard | 371/50 |
| 3,831,144 | 8/1974 | En | 371/50 |
| 3,906,200 | 9/1975 | Petschauer | 235/153 AK |
| 4,044,328 | 8/1977 | Herff | 371/50 |
| 4,224,681 | 9/1980 | Lewine | 364/738 |

*Primary Examiner*—David H. Malzahn
*Attorney, Agent, or Firm*—J. T. Cavender; Albert L. Sessler, Jr.; Elmer Wargo

[57] ABSTRACT

An error detecting and correcting system, comprising: a memory for storing data including a first section, the data being stored in the first section in rows and columns; first means for storing first check bits for the rows of data; and error correcting means, including: means for generating check bits for the columns of data so as to produce a check word for a predetermined number of the rows of data; a second section for storing at least one check word; and processor means operatively coupling the generating means with said first and second sections to enable the error correcting means to utilize the first check bits to locate a row of data in which at least one bit is in error and also to enable the error correcting means to utilize said check word to correct any errors which exist in the row of data.

The method of this invention utilizes the first check bits which relate to the rows of data to detect a particular row in which an error occurs, and also utilizes the associated check word for correcting any error which exists in said particular row.

8 Claims, 18 Drawing Figures

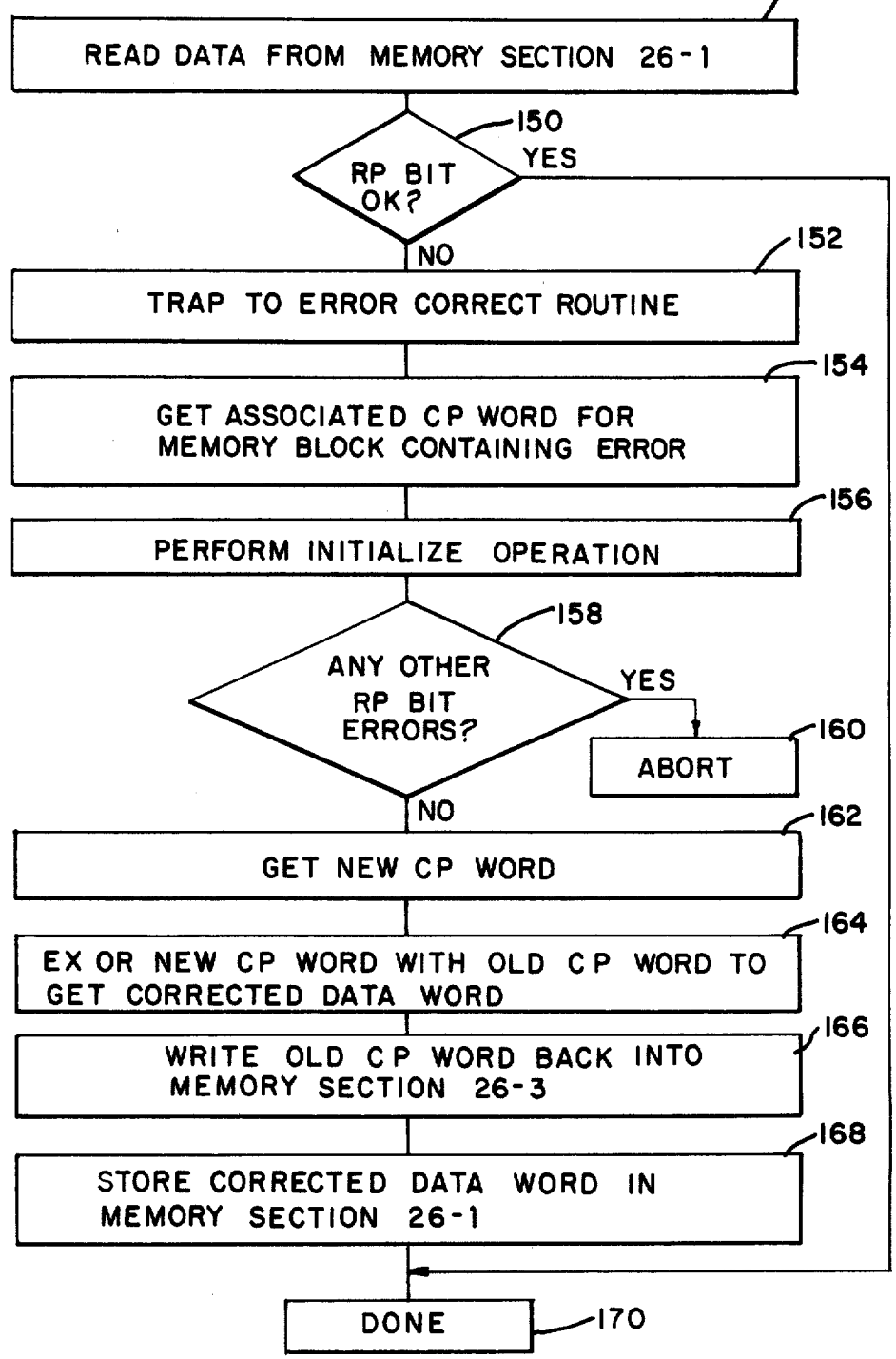

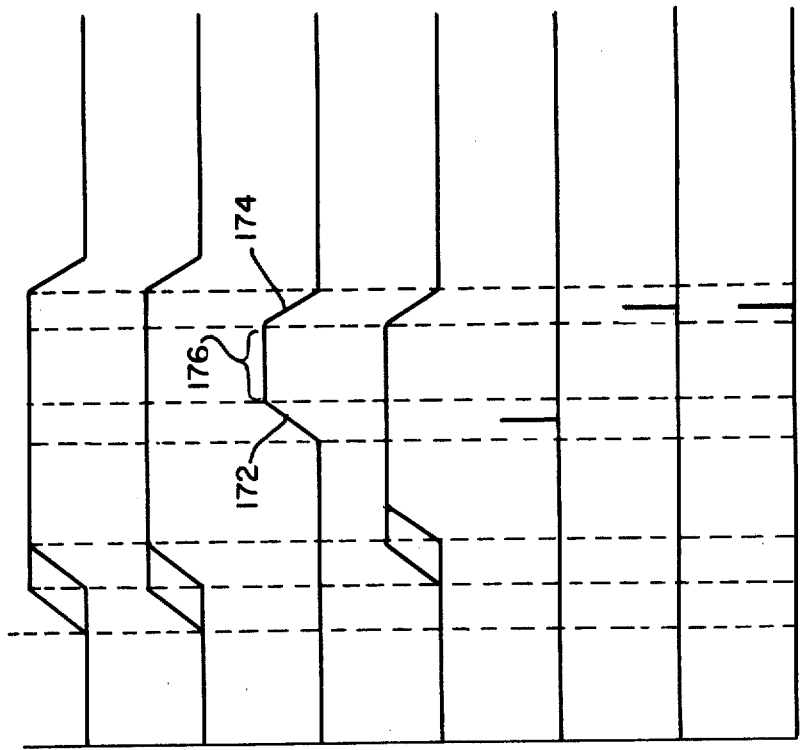

METHOD AND APPARATUS FOR DETECTING AND CORRECTING ERRORS IN A MEMORY

BACKGROUND OF THE INVENTION

This invention relates to a method and apparatus for detecting and correcting failures or errors in computer memories.

As computer technology evolves, the associated computer memories become more dense and more affordable for small and low cost systems. Many free standing terminals such as business equipment terminals presently have more memory capacity than some "large" systems of a few years ago. With this increased memory capacity and with the inherent soft failure rate of high-density, memory chips, the correction of memory errors has become critical, even in low-cost products.

One of the techniques for correcting memory errors employs Hamming error correction codes. These Hamming codes, however, add considerable overhead to the memory system cost, and also significantly degrade the associated memory cycle time. Five Hamming bits, for example, would be required to protect an eight bit data word; six bits would be required to protect a 16 bit data word, etc., with one error correction bit being added for each power of two that the size of the data word increases. These codes must be generated and stored on each write cycle and re-generated and checked on each read cycle. Hamming error correction codes generally represent 20 to 60 percent of the memory component cost and could degrade the memory efficiency by as much as 25 percent. In low-cost computer systems in which the associated memory is a large part of the system cost, or in systems in which throughput is critical, the use of Hamming error correction codes could make the system non-competitive in its market.

SUMMARY OF THE INVENTION

This invention relates to an error detecting and correcting system, comprising: means for storing data including a first section, said data being stored in said first section in rows and columns; first means for storing first check bits for said rows of data; and error correcting means, including: means for generating check bits for said columns of data so as to produce a check word for a predetermined number of said rows of data; a second section for storing at least one said check word, and processor means operatively coupling said generating means with said first and second sections to enable said error correcting means to utilize said first check bits to locate a said row of data in which at least one bit is in error and also to enable said error correcting means to utilize said check word to correct any errors which exist in said row of data.

The method of this invention utilizes the first check bits which relate to the rows of data to detect a particular row in which an error occurs, and also utilizes the associated check word for correcting any error which exists in said particular row.

A feature of this invention is that the first section of the memory can be divided into block sizes to accommodate a user's applications, with each block having a check word associated therewith.

Another feature of this invention is that once an error is detected in reading a particular row of data, all errors in that particular row of data can be corrected, provided that no more than one row of data within any block contains an error.

The method and apparatus of this invention are simple to use and low in cost to produce. The apparatus can generally be added as an "add-on" to existing memory systems, and does not appreciably increase memory cycle time.

These advantages and others will be more readily understood in connection with the following specification, claims and drawings.

BRIEF DESCRIPTION OF THE DRAWING

FIG. 17 is a flow chart showing the various basic steps in the "Error Correct Operation" of this invention; and FIG. 18 is a timing chart showing the relationship among various signals and sequences associated with this invention.

DETAILED DESCRIPTION OF THE INVENTION

Figure 1:
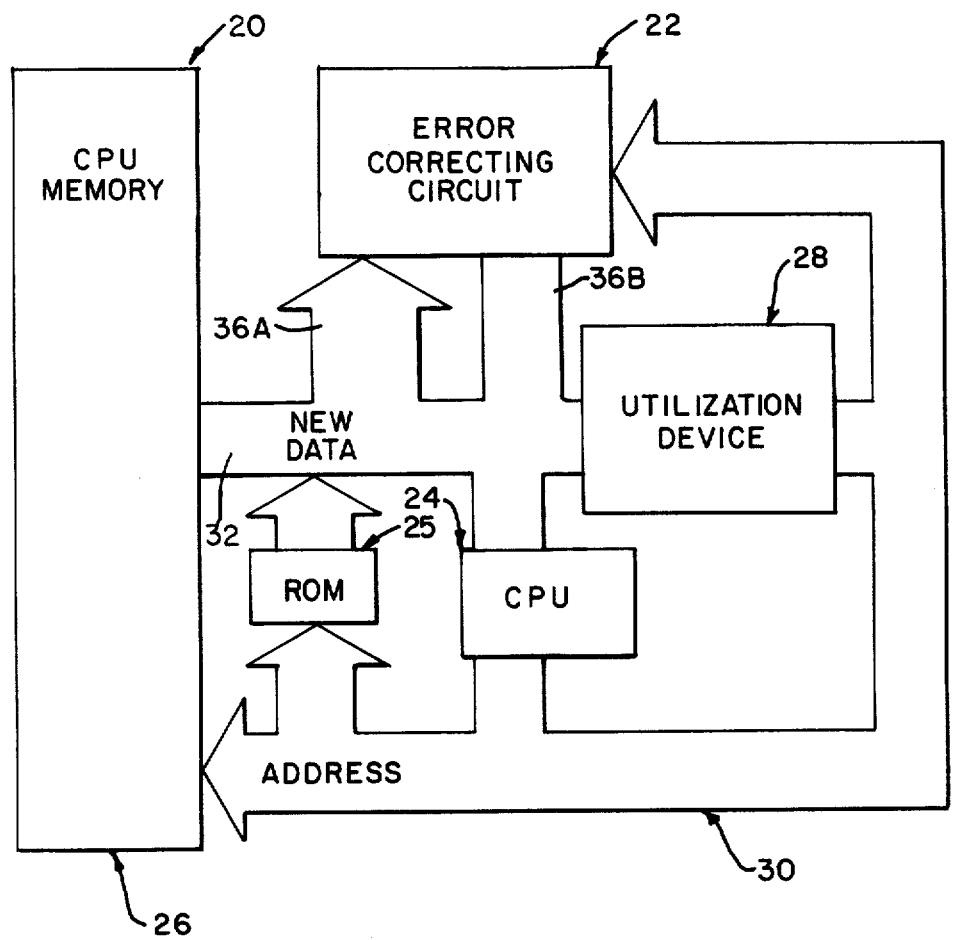
FIG. 1 is a general block diagram showing a memory system which includes the apparatus for correcting errors in the system.

FIG. 1 is a general block diagram showing a computer architecture or system designated generally as 20 in which the apparatus or circuit 22 of this invention may be used. The system 20 includes a central processing unit (CPU) 24, an associated CPU ROM 25 for use in conventional bootstrapping techniques and for storing programs for the CPU, and the associated CPU RAM memory 26. The CPU 24 is interconnected with a utilization device 28 which may, for example, be a printer, storage device, terminal, or the like. The system 20 includes a plurality of buses 30, 32, 36A and 36B which interconnect the CPU 24, the ROM 25, the CPU RAM memory 26, the circuit 22, and the utilization device 28 as shown. The circuit 22 is shown as being outside the CPU RAM memory 26 so as to facilitate a showing thereof; however, the circuit 22 is more intimately related with the CPU RAM memory 26 as is better seen in FIG. 2.

Figure 2:
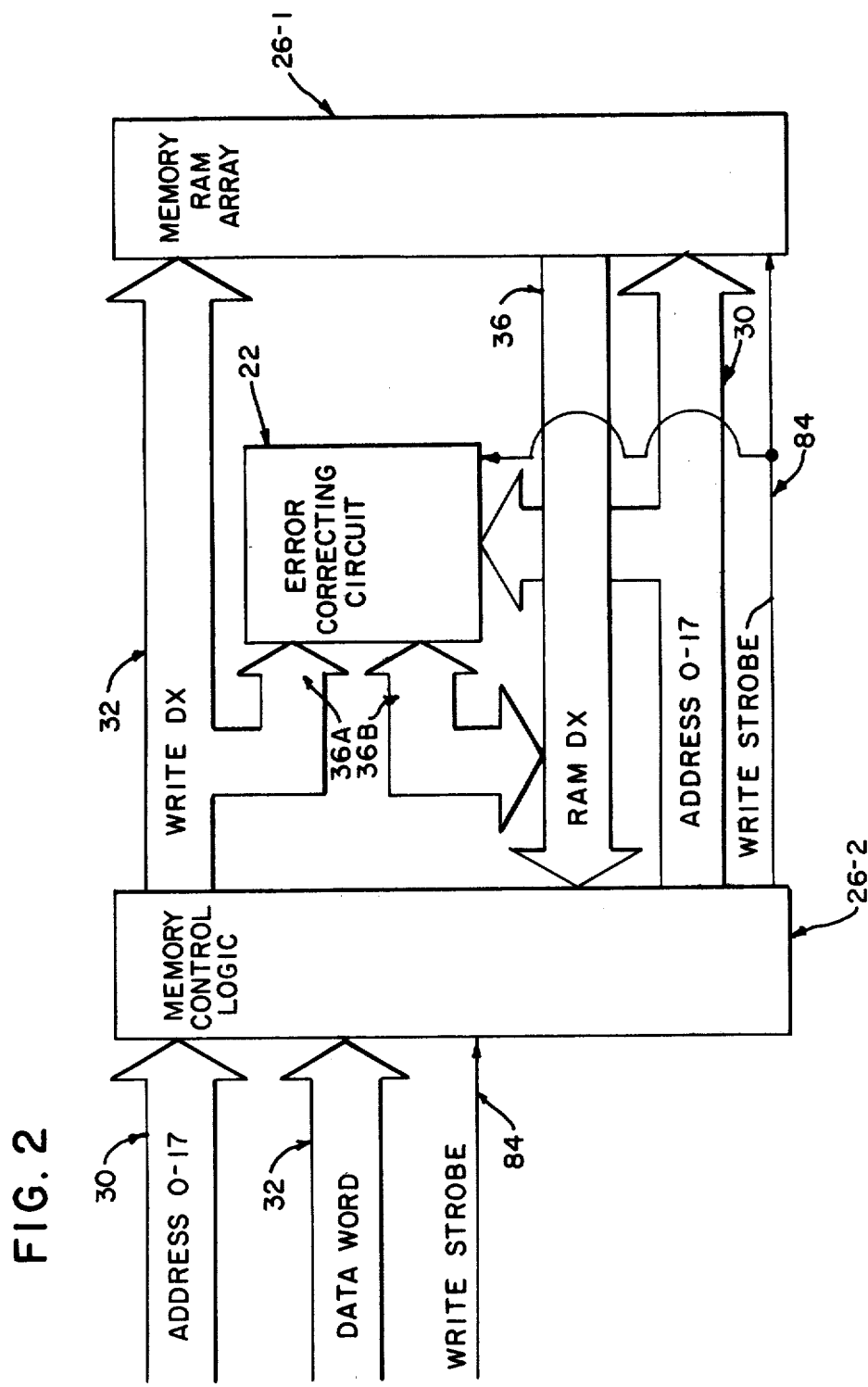
FIG. 2 is a general block diagram showing the relationship between the error correcting circuit and the CPU memory shown in FIG. 1.

FIG. 2 is a general block diagram showing the relationship, in a more detailed way, between the circuit 22 and the CPU RAM memory 26 shown in FIG. 1. The CPU RAM memory 26 is comprised of a memory RAM array 26-1 and the associated, conventional, memory control logic 26-2, with the error correcting circuit 22 being shown interconnected therebetween. Before discussing the circuit 22, it appears beneficial to discuss the organization of the RAM array 26-1 as it relates to this invention.

Figure 3:
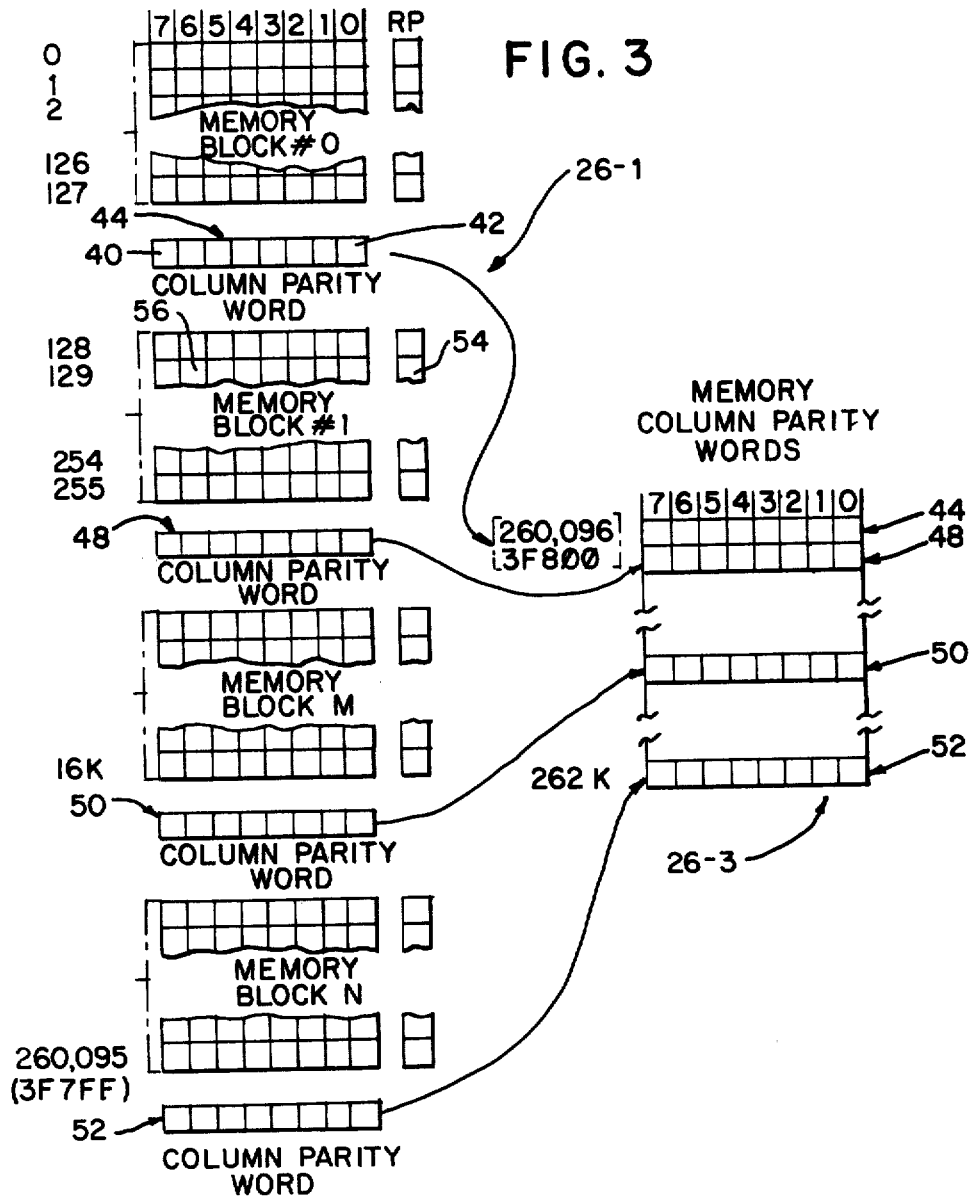
FIG. 3 is a schematic diagram showing one organization for the RAM array shown in FIG. 2.

In this regard, one organization of the RAM array 26-1 is shown in FIG. 3. The particular organization of the array 26-1 is dependent upon a particular application, and the different considerations which are useful in deciding upon a particular organization will be discussed hereinafter.

The RAM array 26-1 (FIG. 3) is shown as being, nominally, a 256 K memory and being arranged as receiving an eight bit byte or word. The array 26-1 is divided into a plurality of memory partitions or blocks such as memory block #$\phi$ followed by memory block #1. Each memory block is composed of 8 bit words, with the addresses for block #$\phi$ being $\phi$ through 127, and with the bit positions #$\phi$ through #7 for the eight bits being shown across the top of the block. The row parity is marked RP, with one such parity bit being included for each word in the memory block #$\phi$. This parity bit may be made either odd or even as is customarily done.

Each of the memory blocks like #$\phi$ shown in FIG. 3 has a column parity word associated therewith as previously explained. The column parity bit in the column 40 parity word for the column of bits under bit position #7 is entered in bit cell 40, and similarly, the column parity bit for the column of bits under bit position #$\phi$ is entered in cell 42. The column parity word designated generally as 44 represents the columnar parity bits for the columns numbered #$\phi$ through #7 for the memory block #$\phi$. While the column parity word 44 (hereinafter called CP word) is shown under its associated memory block #$\phi$, the CP word 44 is actually located at a different location in the RAM array 26-1, as will be described hereinafter.

Continuing with the example given, the memory block #1 (FIG. 3) has addresses from 128 through 255, and the associated CP word for memory block #1 is designated by reference numeral 48. The memory block M, appearing at an address of approximately 16 K, has a CP word 50 associated therewith, and similarly, the memory block N has a CP word 52 associated therewith. The last address which may be used for the block N is listed as 260,095 or a Hexadecimal designation of 3F7FF as shown in parenthesis in FIG. 3; the purpose for this designation will be described later herein.

The CP words 44, 48, 50, and 52 (FIG. 3) are shown underneath their associated memory blocks like #$\phi$, #1 etc., for ease of illustration; however, these parity words are actually stored in a section 26-3, of the memory 26-1 which begins with the address of 260,096 or 3F8$\phi\phi$ (in Hexadecimal form) as shown in parenthesis in FIG. 3. By this addressing technique, an address less than 3F8$\phi\phi$ will initiate an addressing of one of the memory blocks like #$\phi$, #1 etc. in memory section 26-1 while an address equal to or greater than 3F8$\phi\phi$ will address one of the CP words in the memory section 26-3. In the example described, the memory section 26-1 is organized into 2,031 memory blocks (like #$\phi$, #1) and the memory section 26-3 correspondingly contains the associated 2031 CP words. Naturally, the size and organization of the memory sections 26-1 and 26-3 are dependent upon a particular application. Standard RAM units such as Mostek MK 4027 or MK 4116 dynamic RAMs typically may be used for the memory sections 26-1 and 26-3.

The error detecting and correcting technique of this invention can be described generally with regard to FIG. 3. As data words are placed into the memory blocks #$\phi$, #1 etc., the associated row parity bits are calculated and placed in the RP column. These may be made either odd or even parity as is typically done. As data words are placed in a memory block like block #1, the associated CP word 44 is developed by a technique to be later described herein. During a Read operation for example, if the row parity from cell 54 indicates that an error is present for the word at address #129, the CPU 24 (FIG. 1) will initiate an error correction routine to find and correct the error. Assume, for example, that the error is actually located in cell 56 at bit position #6. In one embodiment, the error correcting system 20 will then utilize the associated CP word 48 by techniques to be later described herein and thereby ascertain that the error exists in the bit in cell 56. This bit in cell 56 is then changed to provide corrected data from address 129 in memory block #1. In other words, the usual row parity 54 is used to identify the row in which the error occurs, and the CP word 48 is used to ascertain the particular column in memory block #1 (in the example being discussed) where the error occurs.

Figures 4, 11:
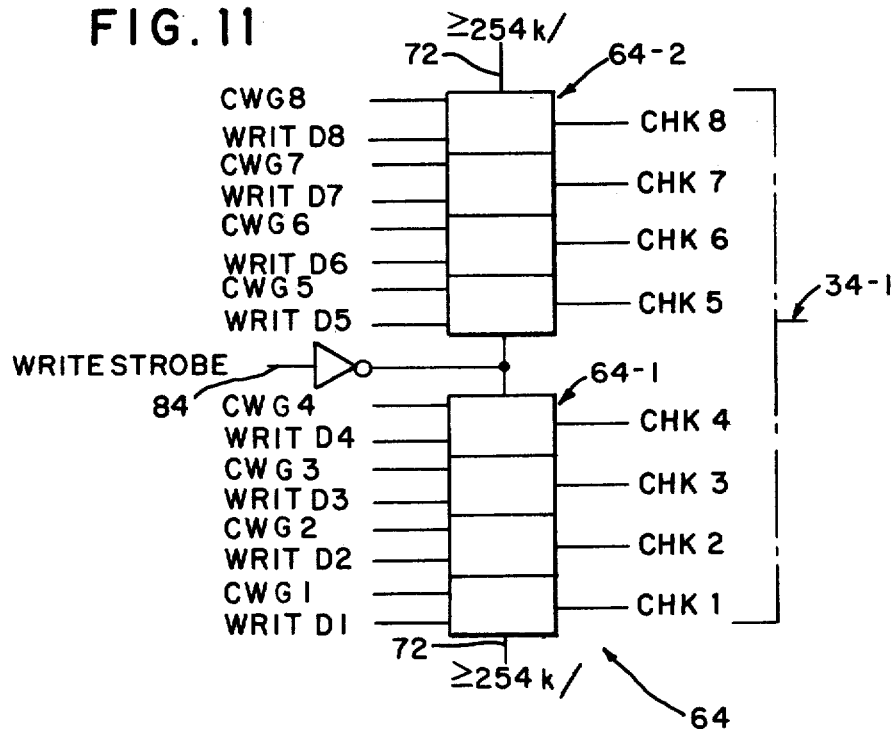
FIG. 4 is a diagram which is used to illustrate the technique for determining the location of an error in a memory block.
FIG. 11 shows a more detailed circuit of the data multiplexer shown in FIG. 5.

FIG. 4 is a diagram which is useful in explaining the technique according to this invention for detecting an error in a data word. The diagram 58 includes ten 8 bit words ranging from #$\phi$ through #9. The row parity for each word is listed under the column marked RP; the parity developed for each word is odd, although even parity could be used. The CP word (similar to parity word 44, for example, shown in FIG. 3) for the ten words in the diagram 58 is comprised of a parity bit for each of the columns #$\phi$ through #7. The column parity bit is made odd to be consistent with the row parity.

In a "Read" operation, when the CPU 24 (FIG. 1) determines that there is an error in a word as determined from the associated row parity bit, it will initiate the error correction routine of this invention. Assume for the moment that word #3 in FIG. 4 is changed from 11010010 to 10011110 (with bits 2, 3, and 6 being in error). The row parity bit (RP) would indicate an error and the CPU 24 would initiate the correction routine which generally is as follows:

(1) The column parity shown at line 60 in FIG. 4 is saved.

(2) A new column parity for all the words in the block except word #3 in FIG. 4 is calculated; in the example shown, this would be 00010000.

(3) The new CP word from paragraph (2) above is Exclusive Or'ed with the original CP word as follows:

| | |
|---|---|
| 00010000 | (New) |
| 11000010 | (Original) |
| 11010010 | Corrected contents of word #3. |

(4) The corrected contents of word #3 are written into the location for word #3 in diagram 58 and used thereafter. In the example discussed in relation to FIG. 4, only 10 words are shown; however, the CP word in the example described in FIG. 3 is developed for an entire memory block which includes 128 words in the example shown.

If the new CP word from paragraph (3) above indicates that there is no error in the CP word, then by the principle of exclusion, the error would be present in the row parity bit itself. Because there are eight bits and one row parity bit for each data word in the example described, random errors would indicate that the row parity bit would be in error one out of nine times. In this situation, the row parity bit is simply toggled or inverted.

During a "write" operation, the CPU 24 (FIG. 1) will send an address over bus 30 to the memory 26 for the address at which the data will be written and the new data to be written will be sent on bus 32. Assume that a new word 10010110 is to be written into word position #3 in FIG. 4. The following general steps exist for a write operation:

(1) The new word (10010110) is Exclusive Or'ed with the old word that exists in word position #3 in FIG. 4 as follows:

| | |
|---|---|
| 11010010 | Old word |
| 10010110 | New word |
| 01000100 | Intermediate parity word |

(2) The intermediate parity word from paragraph (1) above is then Exclusive Or'ed with the CP word 60 (FIG. 4) as follows:

| | |
|---|---|
| 01000100 | Intermediate parity word |
| 11000010 | Old column parity word |
| 10000110 | New column parity word |

(3) The new word (10010110) is written into word position #3 in FIG. 4 while the new CP word (10000110) is written into the memory section 26-3 as discussed in relation to FIG. 3.

In one embodiment of this invention, the associated error correcting circuit 22 shown in FIGS. 1 and 2 is used. The circuit 22 is shown in more detail in FIG. 5 and includes a check word generator 62, multiplexers 64 and 66, the memory section 26-3, the tri-state driver 68 and various buses to be described hereinafter.

The multiplexers 64 and 66, in one state, are used basically to permit the CPU 24 to write directly into the memory section 26-3 (FIG. 5) during initialization thereof, or to permit the CP words to be read from the memory section 26-3. In the second state, the multiplexers 64 and 66 permit automatic updating of the appropriate CP word in memory section 26-3 when a data word is being written into or being updated in memory section 26-1. When an address equal to or greater than a nominal 254 K (actually 3F8φφ in Hexadecimal form) is applied to the address bus 30, a detection circuit 70 (FIG. 6) will generate an active signal on conductor 72.

For an address less than the 3F8φφ mentioned, the circuit 70 produces an inactive signal on conductor 72. Conductor 72 is connected to the multiplexers 64 and 66 and is used to multiplex the data appearing on the inputs thereof.

When the signal on conductor 72 is active, the CPU 24 addresses the memory 26 in the logical address base of the memory section 26-3. With an active signal on conductor 72, the CPU 24 can write data which is on bus 32 directly into the memory section 26-3 at an address which is present on bus 30-1 for the initialization procedure mentioned. At this time, a write signal on conductor 84 connected to the multiplexer 64 is active to prevent the multiplexer 64 from affecting bus 34-1 when reading from the memory section 26-3 during an error correction cycle.

Figure 5:
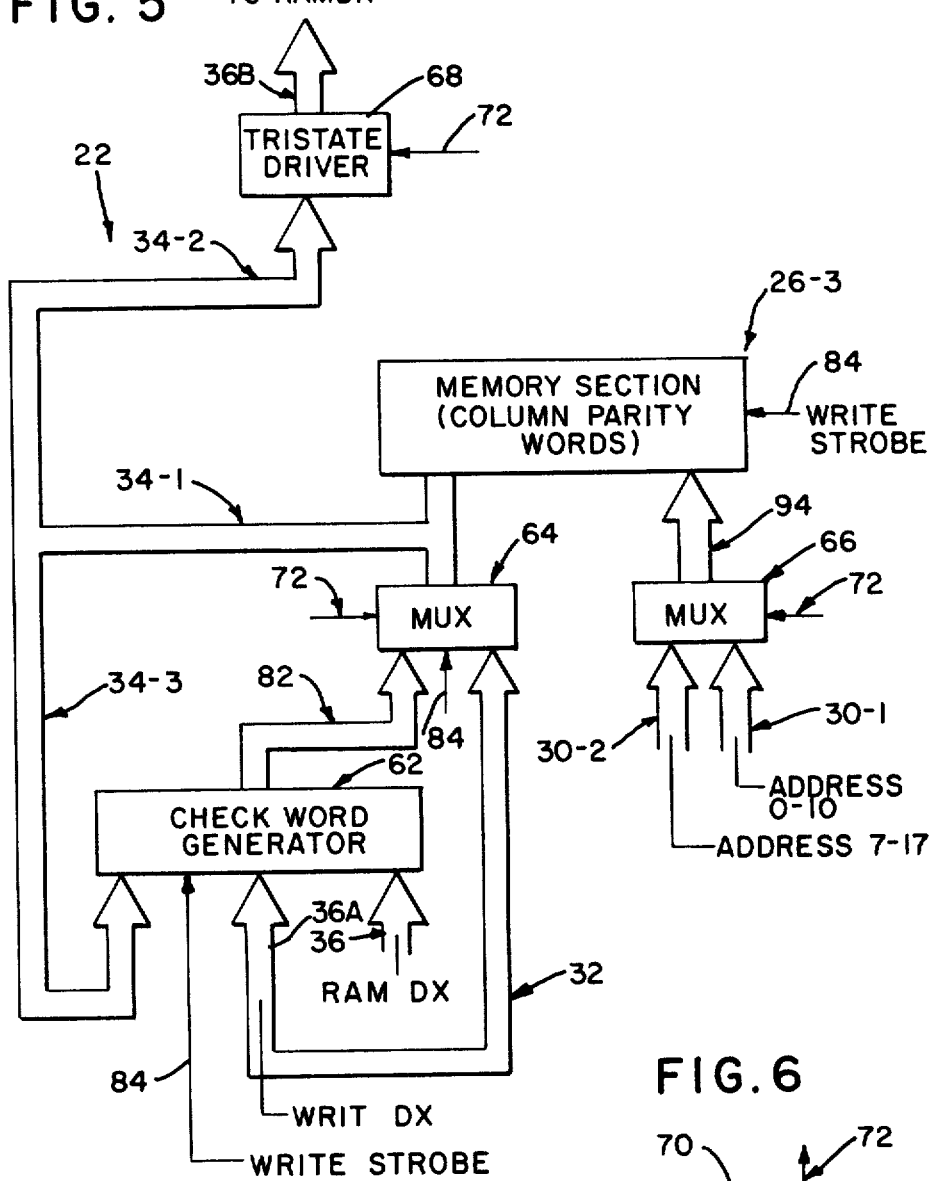
FIG. 5 is a general schematic diagram in block form showing more details of the error correction circuit shown in FIGS. 1 and 2.

During the error correction technique mentioned earlier herein, the CPU 24 reads a particular CP word out of the memory section 26-3 when the signal on conductor 72 is high and the write signal on conductor 84 is in the inactive state, with the address for the particular CP word being placed on the address bus 30-1 (FIG. 5). Because this is not a write operation but a read operation, i.e. the write signal on conductor 84 is in the inactive state, the CP word located on the address on bus 30-1 will be gated out of the memory section 26-3 via buses 34-1 and 34-2 to the tri-state driver 68. From the driver 68, the CP word is routed via the bus 36B to the CPU 24 for the error correction techniques discussed generally, earlier herein.

During an "update" or "write" operation, when a data word in the memory section 26-1 (FIG. 3) is changed, for example, it means that the CP word in memory section 26-3 for the associated memory block (like #φ, #1, etc.) also has to be modified as explained earlier herein. A portion of the address which is used to access a particular data word from a memory block from the memory section 26-1 (FIG. 3) is used to access the associated CP word from the memory section 26-3 (FIGS. 3 and 5). In this regard, the new data word which is to be written into the memory section 26-1 also is impressed on the data bus 32 in FIG. 5. This means that the new word to be written in memory section 26-1 also passes through the check word generator 62 (FIG. 5) so as to change the associated CP word in memory section 26-3 for the associated memory block in memory section 26-1.

The address at which the new data word is to be written into is on bus 30 in FIG. 1; this also causes the old word for that address to be placed on the bus 36 (FIG. 5) which is also fed into the check word generator 62.

Figure 7:
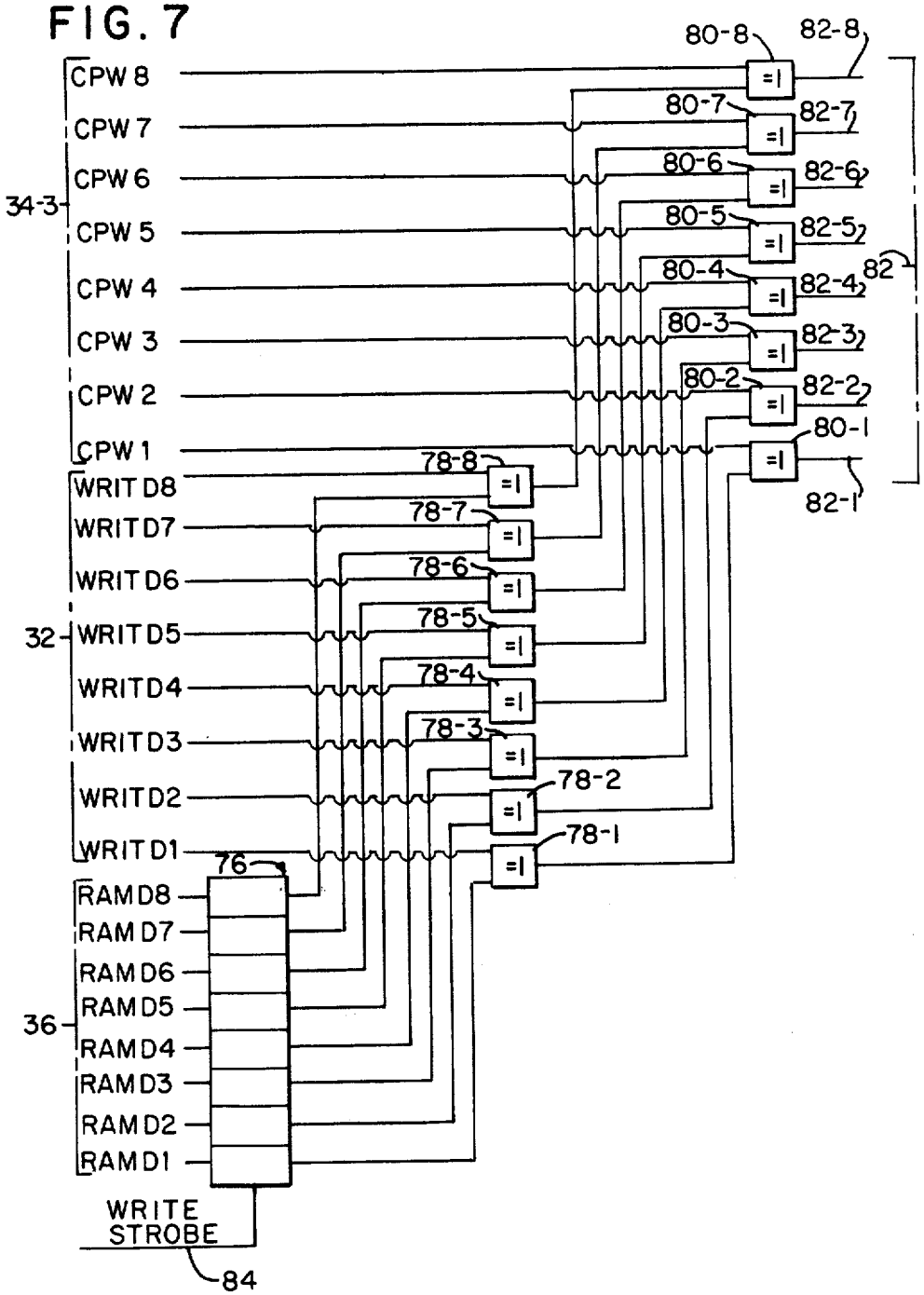
FIG. 7 is a schematic diagram, in block form, showing more details of the check word generator shown in FIG. 5.

The check word generator 62 (FIG. 5) is shown in more detail in FIG. 7. It should be recalled that the generator 62 performs the Exclusive Oring functions mentioned earlier herein with regard to a "write" operation, for example.

The bus 36 (FIGS. 2 and 5) is comprised of the RAMD1-RAMD8 conductors or lines (as shown in FIG. 7), which lines are fed into a register 76 which is part of the check word generator 62. At this time, the data which is on these lines is the old data word which is located at the address of the new word to be written therein. The new data word is fed over the general bus 32 (which is comprised of the write lines WRITD1--WRITD8) which is also fed into the generator 62. The generator 62 is also comprised of a first plurality of Exclusive Or gates 78-1 through 78-8 as shown. The old data word and the new data word from the RAMD1-8 lines and the WRITD1-8 lines, respectively, are fed into the gates 78-1 through 78-8, respectively, to produce what is called an intermediate parity word. The outputs of the gates 78-1 through 78-8 are fed, respectively, into one input of the Exclusive OR gates 80-1 through 80-8 as shown in FIG. 7. The old CP word which is located in memory section 26-3 is fed over lines CPW1-CPW8 (which comprise the bus 34-3) into the remaining inputs to the Exclusive Or gates 80-1 through 80-8, respectively. Thus, the intermediate parity word and the old CP word are Exclusive OR'ed in the gates 80-1 through 80-8 and the output therefrom is fed over the bus 82 to the multiplexer 64 (FIG. 5). The bus 82 is comprised of the lines 82-1 through 82-8 shown in FIG. 7, which lines carry the new CP word from the check word generator 62 to the memory section 26-3 via the multiplexer 64. The data on the bus 82 is transferred to the memory section 26-3 when the signal on the conductor 72 is false or at a low level. The new CP word is written into the memory section 26-3 upon the occurrence of a write strobe 84 which issues from the CPU 24.

Figure 8:
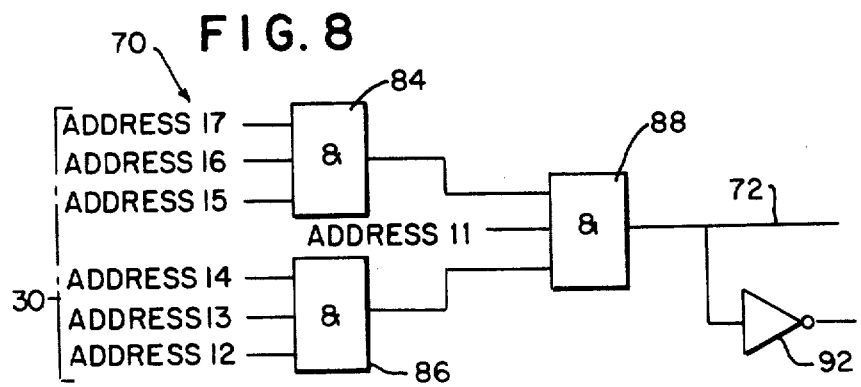
FIG. 8 shows a more detailed circuit of the detector circuit shown in FIG. 6.

The detector circuit 70 (FIG. 6) is shown in more detail in FIG. 8. The circuit 70 is comprised of three AND gates 84, 86, and 88, and inverter 92. The gates 84, 86, and 88 are three input AND gates with gate 84 receiving inputs from the address lines 17, 16, and 15, of the bus 30, and with gate 86 receiving inputs from the address lines 14, 13, and 12 of the bus 30. The address line 11 of bus 30 is fed into one input of AND gate 88. The outputs of AND gates 84 and 86 are also fed into the AND gate 88 as shown. As previously stated, the signal on line 72 becomes true or active when the address on bus 30 is 3F800 (in Hexadecimal form) or greater. To summarize the activities during the states of the signal 72, when this signal is active, it means that the CPU 24 wishes to address directly, the memory section 26-3 as part of the initialization procedure mentioned earlier herein, and it also could mean that during a normal Read operation, the CPU 24 has found an error via the row parity RP bit and it wishes to access the memory section 26-3 to obtain the associated CP word to begin the error correction procedure discussed earlier herein. When the signal 72 is in the inactive state, it means that the CPU 24 is engaged in a reading or writing process for accessing a word in the memory section 26-1, and accordingly, if the CPU 24 is engaged in a writing process, the associated CP word in the memory section 26-3 (FIG. 5) needs to be modified as explained earlier herein.

Figure 9:
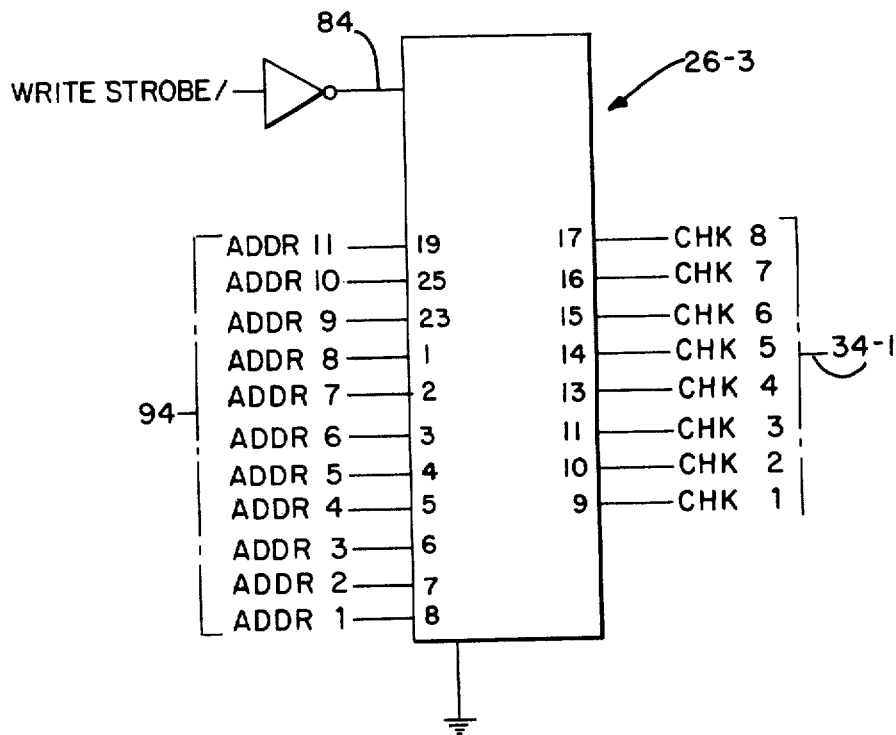
FIG. 9 shows a more detailed circuit of the memory section shown in FIG. 5.

The memory section 26-3 (FIG. 5) is shown in more detail in FIG. 9. In the embodiment described, the section 26-3 is comprised of a 2 K×8 bit static RAM such as an integrated circuit (IC) chip MK 4802, for example, which is manufactured by Mostek Corporation. The address lines ADDR1-ADDR11 shown comprise the bus 94 shown in FIG. 5. The CP words coming into or going out of the memory section 26-3 travel over the lines marked CHK1-CHK8 which comprise the bus 34-1. The write strobe signal 84 is also shown.

Figure 10:
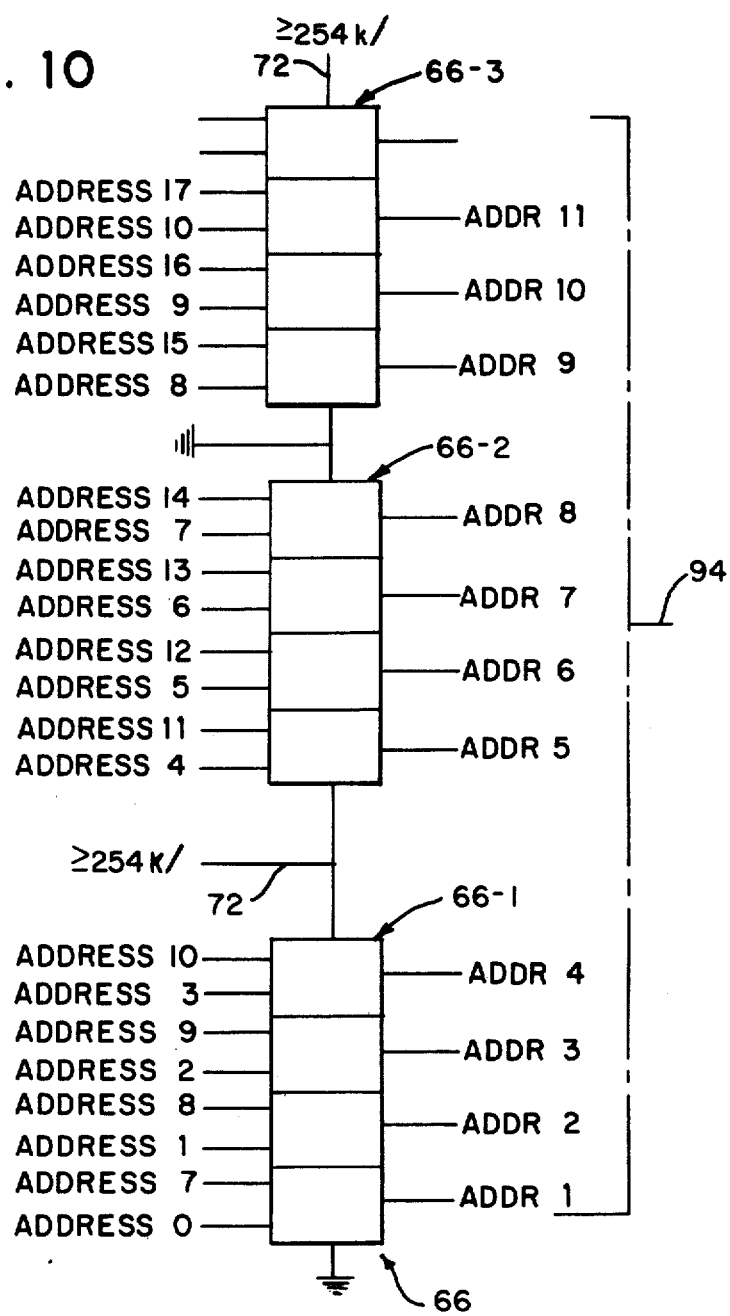
FIG. 10 shows a more detailed circuit of the address multiplexer shown in FIG. 5.

The multiplexer 66 (FIG. 5) is shown in more detail in FIG. 10. The multiplexer 66 is comprised of multiplexer sections 66-1, 66-2, and 66-3, with each section being comprised of a conventional multiplexer such as IC chip #74LS158 which is manufactured by Texas Instruments, for example. The inputs from buses 30-1 and 30-2 in FIG. 5 are connected as follows. The address line #0 from bus 30-1 or the address line #7 from bus 30-2 is selected to be placed on address line #1 of bus 94 depending upon the status of the signal 72 as previously described. Correspondingly, the address line #10 from bus 30-1 or the address line #17 from bus 30-2 is selected to be placed on the address line #11 of bus 94 depending upon the status of signal 72 as previously described. The outputs ADDR1-ADDR11 comprise the bus 94 which provides the address to the memory section 26-3 in FIG. 5.

The multiplexer 64 shown in FIG. 5 is also shown in more detail in FIG. 11. The multiplexer 64 is comprised of multiplexer sections 64-1 and 64-2 which are interconnected as shown. In one state (when the signal 72 is in the inactive or low state) the data on data lines WRITD1-WRITD8 which comprise the bus 32 pass through the multiplexer 64 (via the bus 34-1) to the memory section 26-3. In the second state, a new CP word coming from the generator 62 (FIG. 5) passes through the multiplexer 64 via the lines CWG1-CWG8 (which comprise the bus 82) to the memory section 26-3. The CHK1-CHK4 and the CHK5-CHK8 output lines of the multiplexer sections 64-1 and 64-2, respectively comprise the bus 34-1 shown in FIG. 5.

The tri-state driver 68 shown in FIG. 5 is a conventional driver. The only time that the error checking circuit 22 outputs any data on bus 36 from the tri-state driver 68 is that time when the CPU 24 is trying to correct an error in the memory section 26-1 during a "Read" operation as previously explained. The tri-state driver 68 gates data on to the bus 36B when the signal on conductor 72 is active or on.

Figure 12:
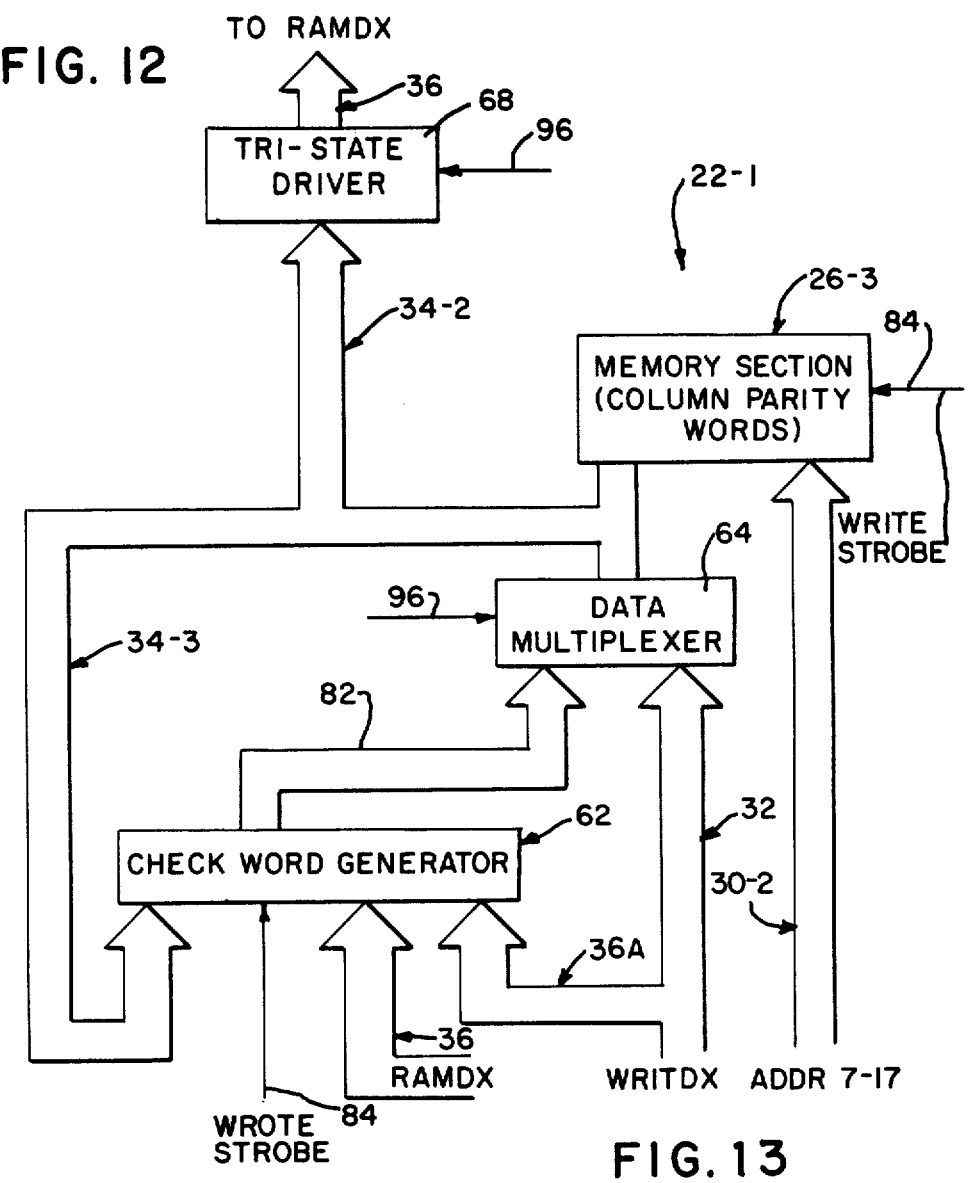
FIG. 12 shows a second embodiment, in block form, of the error correcting circuit of this invention.
Figure 13:
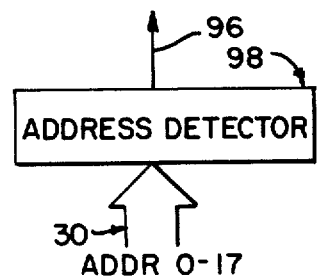
FIG. 13 shows an address detector (in block form) which is associated with the circuit shown in FIG. 12.

FIG. 12 shows a second embodiment of the error correcting circuit of this invention which is designated generally as 22-1. The circuit 22-1 is substantially similar to the circuit 22 shown in FIG. 5; accordingly, like reference numerals are used to identify similar elements in both FIGS. 5 and 12. The detector circuit 98 (FIG. 13) associated with the circuit 22-1 is different from the detector circuit 70 (FIG. 6), therefore a discussion of the circuit 98 will be discussed prior to the operation of circuit 22-1.

Figure 14:
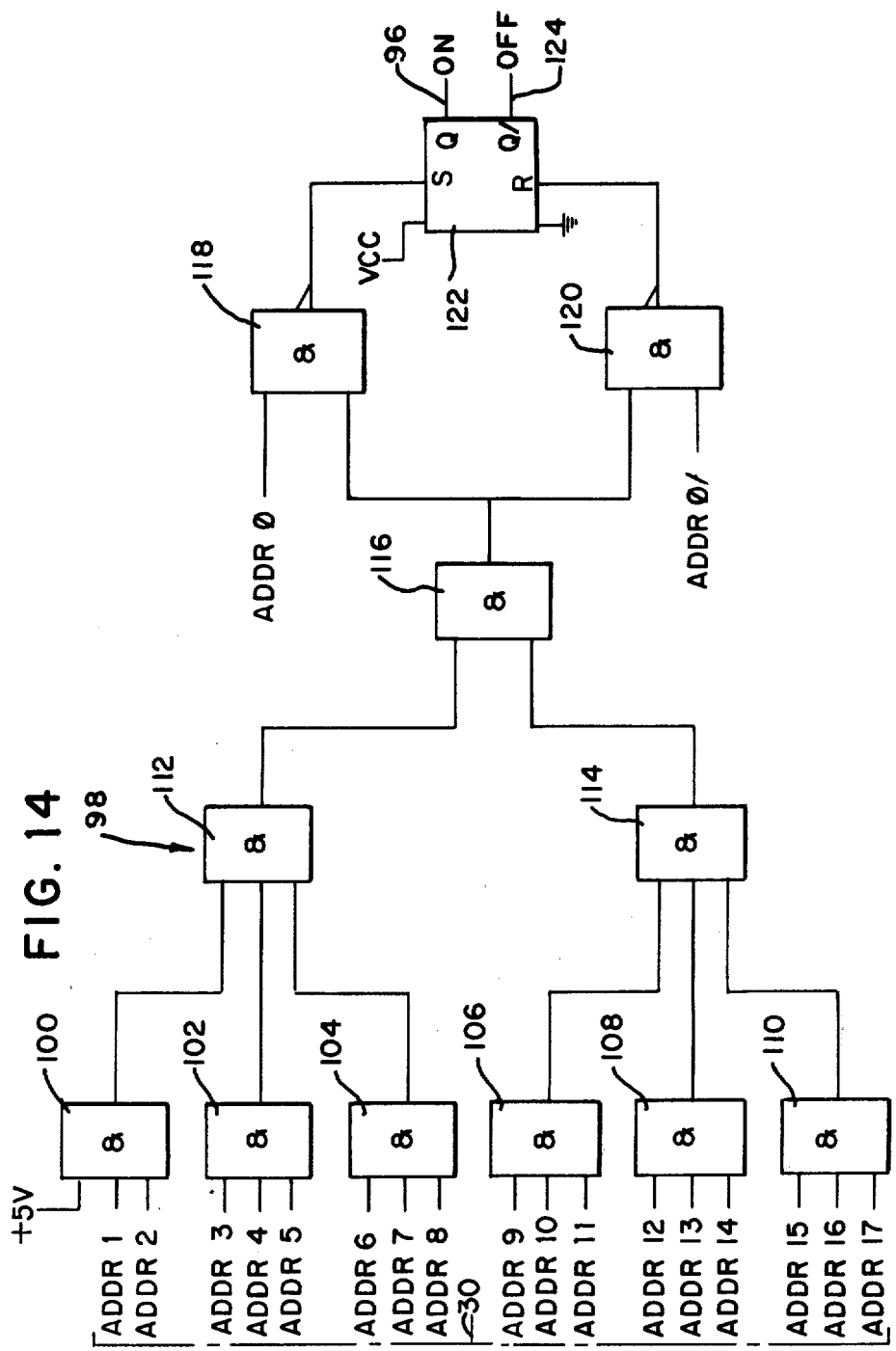
FIG. 14 shows a more detailed schematic diagram (in block form) of the address detector shown in FIG. 13.

The detector circuit 98 (FIG. 13) is shown in more detail in FIG. 14. The eighteen address lines ranging from the least significant bit on line ADDR$\phi$ to the most significant bit on line ADDR17 comprise the address bus 30 shown in FIG. 13. The circuit 98 includes a plurality of AND gates 100-116 which are conventionally inter-connected to produce an active or binary "1" output at gate 116 when all the data bits on the lines ADDR1-ADDR17 are binary ones. The output from AND gate 116 is fed into the NAND gates 118 and 120. The remaining input to NAND gate 118 comes from the address line ADDR$\phi$, and when the input on this line and all the other address lines of bus 30 are binary 1's, the flip flop 122 is set, producing a high level on conductor 96. The remaining input to NAND gate 120 is connected to the address line ADDR$\phi$/, and when the input on this line is a binary 1 and the inputs on all the other address lines ADDR1-ADDR17 are binary 1's, the flip flop 122 is reset, producing a high level at the Q/output thereof and on the conductor 124. This Q/output is useable as a control signal in some memory organizations. In other words, the driver 68 (FIG. 12) gates a CP word from the memory section 26-3 on to the bus 36 when the Q output of flip flop 122 is a binary 1. The CPU 24 (FIG. 1) places an output of 3FFFF (in hexadecimal form) on the address lines ADDR$\phi$-ADDR17 comprising bus 30 when it wants the detector circuit 98 in FIG. 12 to be enabled, and it places an output of 3FFFE on the bus 30 when it wants this circuit 98 disabled; the ROM 25 (FIG. 1) may be used to store the associated program for effecting this purpose.

In other words, when control signal 96 is active, the last 2 K of memory section 26-1, namely the address 260096 to 262143 are replaced with the 2K of CP words in memory section 26-3 as a part of memory section 26-1. When the control signal 96 to memory section 26-3 (FIG. 12) is active the last 2K of memory section 26-1 are returned to the normal address base of 260096 to 262143. The CPU 24 can now access data in this part of memory section 26-1 but can not access a CP word in memory section 26-3. Signal lines 96 and 124 in FIG. 4 are mutually exclusive.

It should be noted that the address lines #$\phi$-#10 in FIG. 5 comprise bus 30-1 and the address lines #7-#17 comprise bus 30-2, with both of these buses being part of bus 30 shown generally in FIG. 1. Notice that in FIG. 12, the address lines #7-#17, comprising bus 30-2, are fed directly into the memory section 26-3.

While the error correcting circuit 22 of FIG. 5 and the error correcting circuit 22-1 of FIG. 12 are substantially similar, there are some general differences. For example, the method of accessing the memory section 26-3 in FIG. 5 utilizes the last 2K of addresses as the enabling means for directly writing into or reading from the memory section 26-3. The memory section 26-3 is treated as a physically separate memory from the memory section 26-1. It should be recalled that the memory section 26-1 is nominally 256K in size in the example being given; however only a nominal 254K of this memory is used. Whenever the CPU 24 tries to access the last 2K bytes of memory section 26-1, the detector circuit 70 in FIG. 5 detects this and it switches the memory section 26-1 off and causes the tri-state driver 68 in FIG. 5 to become active via a high level or active signal on conductor 72. This means that the data bus 36 (FIG. 2) from the memory section 26-1 is placed in the tri-state or inactive mode and the driver 68 (FIG. 5) is turned-on to the active mode. Accordingly, the CP word from the memory section 26-3 whose address is on the data bus 30-1 (FIG. 5) will be outputted (via bus 36B) to the CPU 24 via the now active driver 68. As previously stated, the output of the detecting circuit 70 (FIG. 6) goes to the active level when an address of 3F8$\phi\phi$ or greater (in Hexadecimal form) is placed on the address lines $\phi$-#17 of bus 30. As far as the CPU 24 is concerned, it behaves as though it is working with the last 2K bytes of memory section 26-1, when in actuality, it is working with a different 2K bytes of memory.

Figure 6:
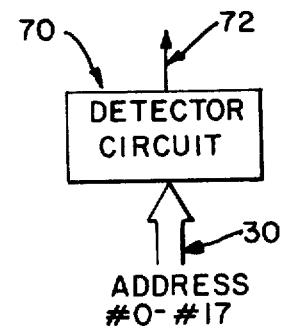
FIG. 6 is a block diagram showing a detector circuit used with the circuit shown in FIG. 5.

With regard to the circuit 22-1 shown in FIG. 12, the only method of accessing the memory section 26-3 is to consider it as an extension of the memory section 26-1; it is actually addressed as a part of the memory section 26-3. In this regard, the CPU 24 sends an address of 3FFFF (in Hexadecimal form) on bus 30 to detector circuit 98 (FIG. 13) to produce a high level or active signal on conductor 96 to activate the tri-state driver 68 and de-activate memory section 26-1, and conversely, the detector circuit 98 is disabled and the memory section 26-1 is enabled by placing an address of 3FFFE on the bus 30. The circuit 22 in FIG. 5 "wastes" or does not use the last 2K bytes of memory mentioned, whereas the circuit 22-1 in FIG. 12 wastes only the last 2 bytes of memory. However, slightly more logic circuits and 1 more memory cycle time are required for circuit 22-1 (FIGS. 12, 13 and 14) than are required for circuit 22 (FIGS. 5, 6, and 8).

Figure 15:
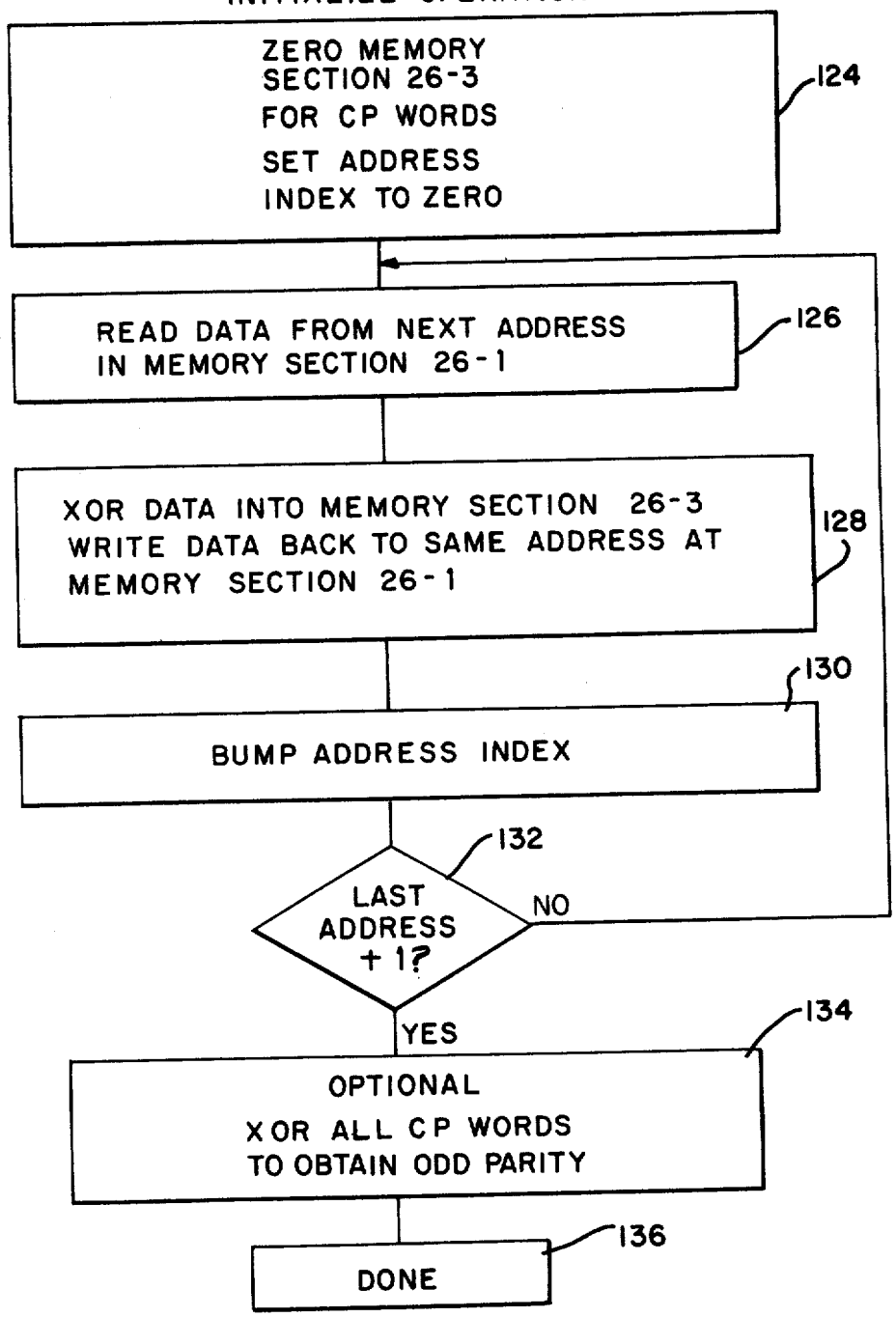
FIG. 15 is a flow chart showing the "Initialize Operation" of the memory system of this invention.

FIG. 15 is a flow chart showing steps for an "Initialize Operation" for the system 20 shown in FIG. 1. This Initialize Operation should be performed any time the validity of the contents of the memory section 26-3 (FIG. 5) is questionable. Such questionable times occur at power up, after a power interrupt, at loadtime, or after processor failure, etc.

The contents of the entire memory section 26-3 (FIGS. 5 and 12) is written with zeroes as shown by step 124 in FIG. 15. This is done to eliminate random data or "garbage" which may exist in the memory section 26-3. The address index for the memory section 26-1 is set to zero. Steps 126, 128, 130, and 132 relate to loading the memory section 26-1 with the data to be stored therein after it has been conventionally initialized with zeroes. At this point, data to be stored in the memory section 26-1 has been loaded therein, conventionally.

At step 126 (FIG. 15), the data from the next address in memory section 26-1 (which is associated with memory block #$\phi$ in the example being described) is read. After this data is read out from memory section 26-1, it is then written back into the same location of memory section 26-1; this writing operation causes the data to be Exclusive OR'ed at step 128 (via the circuit 22) with the particular CP word in memory section 26-3 which is associated with memory block #$\phi$ as previously described. The updated CP word is then multiplexed back into the memory section 26-3 as previously described.

At step 130, the address index is increased by one and the process described in relation to steps 126, 128, and 130 is repeated for each address in a memory block for the memory section 26-1. When the last address has been reached at step 132, the memory section 26-3 contains the CP word for each of the memory blocks therein. Each CP word represents the cumulative Exclusive OR of all the data words in the associated memory block. If an odd parity for the CP words is desired, an additional step 134 may be utilized to Exclusive OR all the bits of each of the CP words in memory section 26-3 with binary ones so as to obtain an odd parity. Whether odd or even parity is used is optional. At step 136, the Initialize Operation is complete.

Figure 16:
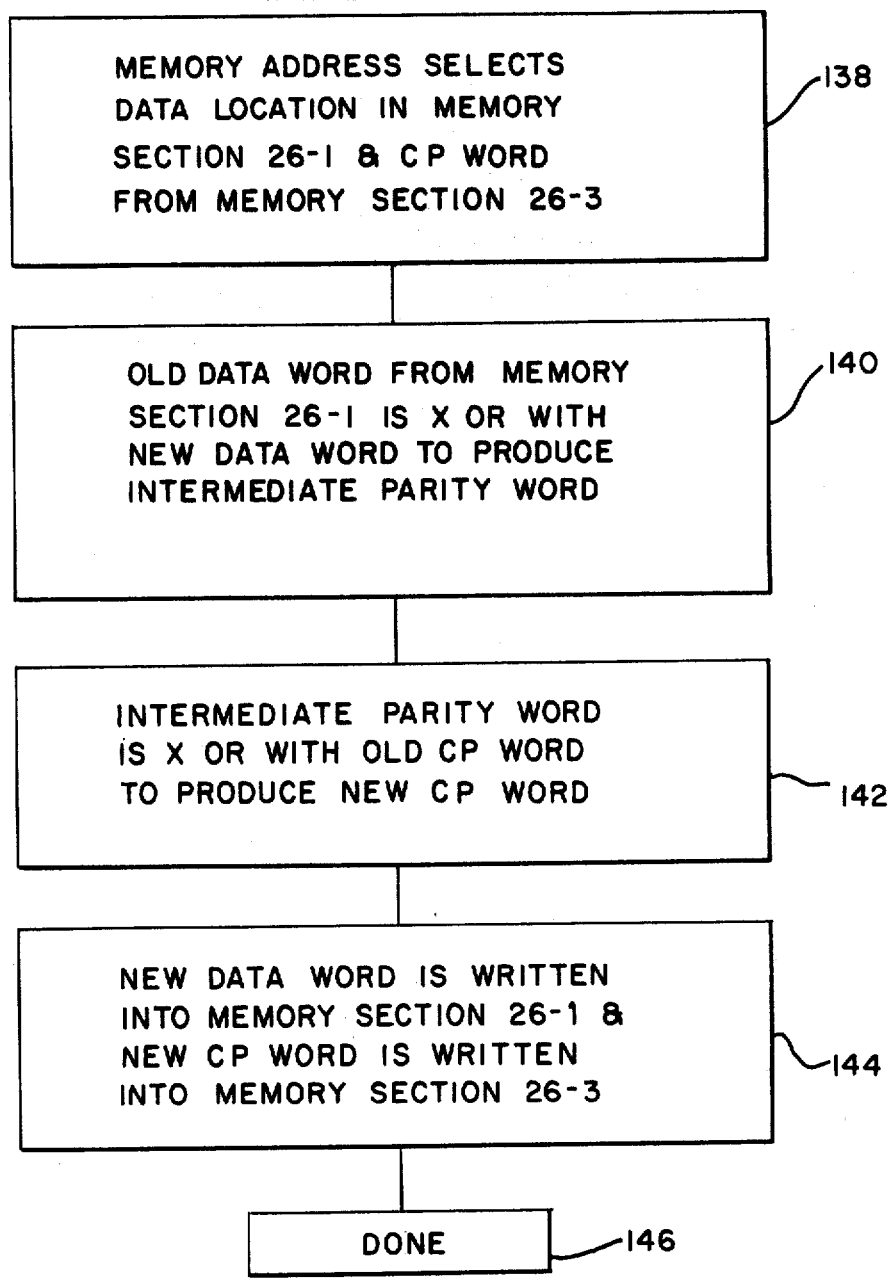
FIG. 16 is a flow chart showing the various steps involved in a "Write Operation"

FIG. 16 is a flow chart which shows the various steps involved in a "Write Operation". In a write operation, new data is to replace old data which exists in the memory section 26-1. At step 138 in FIG. 16, the memory address of the data word to be changed is supplied by the CPU 24. The old data word from memory section 26-1 enters the check word generator 62 (FIG. 5) via bus 36 and the new data word to be written into that location in memory section 26-1 enters the check word generator 62 via bus 32. In this regard whenever data is to be written into memory section 26-1, the address at which it is to be written is impressed upon the address bus 30 (FIG. 1) and CPU memory 26 puts the old data word on the RAM DX bus which is shown as bus 36 in FIG. 5.

At step 140 in FIG. 16, the old data word from memory section 26-1 is Exclusive ORed with the new data to be written at the address of the old data word to thereby produce an intermediate parity word as described in relation to FIG. 7. At step 142 (FIG. 16) the intermediate parity word is Exclusive ORed with the old CP word which enters the check word generator 62 on bus 343 in FIG. 5 for the associated memory block to produce a new CP word. Thereafter at step 144, the new data word is written into the memory section 26-1 and the associated new CP word is written into the memory section 26-3 in FIG. 5. This writing occurs upon the occurrence of the write strobe signal on conductor 84 for memory section 26-3. After step 144 is completed, the "Write Operation" shown in FIG. 16 is completed as shown at step 146.

The basic steps in the "Error Correction Operation" of this invention are shown in the flow chart in FIG. 17. As previously stated, the data which is read from memory section 26-1 (as at step 148 in FIG. 17) has an associated row parity (RP) bit also read out of the section 26-1. The memory control logic 26-2 in FIG. 2 has conventional circuitry (not shown) associated therewith for calculating the row parity bit for the data which is just read from the memory section 26-1. (Note, that while the memory section 26-1 is referred to as storing data, what is stored therein could also be instructions and the like). At step 150 in FIG. 17, if the just-recently-calculated, row parity agrees with the row parity which was stored with the data word being read from memory section 26-1, when the routine progresses to step 170 in FIG. 17, indicating that no error exists. If an error exists in the data word being read, the next step traps the error correct routine as shown by step 152.

The term "trap" as used in step 152 means to "highlight" as soon as an error is found. At this time a nonmaskable interrupt is raised in the CPU 24 and the CPU 24 will transfer control from the location in memory section 26-1 or ROM 25 (FIG. 1) at which it is presently working to the location therein where the error correction operation is located. The CPU 24 will also initiate the transfer of the address for the data word in memory section 26-1 at which the error was detected with an instruction to hold the address for the data word which has to be corrected. By this technique, the memory section 26-1 knows the address of the data word to be corrected at the end of the error correction operation.

At step 154 in FIG. 17, the associated CP word for the memory block (like #$\phi$, #1 etc. in FIG. 3) containing the data word in error is obtained. With the circuit 22-1 shown in FIG. 12, for example, the CPU 24 will access the address 3FFFF (in hexadecimal form); this will enable the detector circuit 98 (FIG. 13), causing the tri-state driver 68 (FIG. 12) to become active to allow the associated CP word to be read from the memory section 26-3. As a part of step 154 in FIG. 17, the address for the associated CP word in memory section 26-3 is zeroed.

At step 156 in FIG. 17, the initialize operation, already discussed earlier herein, is repeated. However, the initialization operation is performed on only that particular memory block in memory section 26-1 in which the data word in error is located. Also, the new CP word which is generated is generated without including the data word in error. At this time at step 158, the row parity bit for each of the data words in the associated memory block is examined to detect an error in the associated data word. If a second error exists in another data word in the memory block being Exclusive ORed, then the routine aborts at step 160. This is because the error correction method of this invention can correct only one data word; if errors exist in two or more data words in any one memory block, then the error correction routine must be aborted and the errors corrected by conventional means. A feature of this invention is that it can correct all errors within a data word if that particular data word is found to be in error via its associated RP bit.

Assuming that no additional errors were found at step 158 in FIG. 17, the error correction routine proceeds to step 162; the new CP word which is generated (via the check word generator 62) is located within the appropriate location in the memory section 26-3 (FIG. 12). Thereafter the CPU 24 issues the 3FFFF address mentioned earlier herein to get the new CP word from the memory section 26-3 to the bus 36 via the tri-state driver 68. The CPU 24 (FIG. 1) then will Exclusive OR this new CP word with the old CP word as shown in step 164, and this process results in the corrected data word.

At step 166 (FIG. 17), the old CP word is placed back into the memory section 26-3 (FIG. 12) by placing the CP word on bus 32 and the associated address on bus 30-2. At this time an address location of 3FFFE is also fed to the address detector circuit 98 so as to disable the driver 68. A write strobe signal on conductor 84, coming from the CPU 24, is used to write the old CP word into the memory section 26-3. A step 168, the corrected data word is stored in the memory section 26-1 to complete the error correction routine as indicated by step 170.

Some additional review points with regard to the status of the outputs of detector circuit 98 (FIGS. 13 and 14) as they relate to the error correction operation shown in FIG. 17 appear beneficial. As previously stated, an address of 3FFFF to circuit 98 produces an active signal on conductor 96 which enables the tri-state driver 68 (FIG. 12). An address of 3FFFE to circuit 98 produces an inactive or low level on conductor 96. A low level signal from circuit 98 means that the CP words in memory section 26-3 cannot be directly accessed by the CPU 24. With the preceding in mind, the signal level on conductor 96 to driver 68 (FIG. 12) must be at a high level at step 154 in FIG. 17 to withdraw the affected CP word from the memory section 26-3. At step 156 in FIG. 17, the signal level on conductor 96 must be at a low level so that the memory section 26-1 can be accessed to perform the initialize operation and to check for other row parity errors. At step 162 in FIG. 17, the signal level on conductor 96 is again switched to the high level so that the memory section 26-3 can be accessed for the new CP word. The signal level on conductor 96 then stays at the high level through step 166 in FIG. 17 at which the old CP word is written back into the memory section 26-3. Thereafter, the signal level on conductor 96 is switched to the low level so that the corrected data word can be stored in the memory section 26-1, and this signal level then remains at a low level until the next error occurs.

The circuit 22 in FIG. 5 operates in substantially the same manner as does the circuit 22-1 shown in FIG. 12 with regard to the error correct operation shown in FIG. 17.

FIG. 18 is a timing chart showing the relationship among various signals and sequences associated with this invention. Line #1 shows data from the CPU 24 which appears on bus 30 (as shown in FIG. 2, for example) and which is to be written into memory section 26-1. Line #2 contains the address (on bus 32) at which the data on bus 30 is to be written. The data and addresses on buses 30 and 32, respectively, remain available as long as Lines #1 and #2 remain at a high level in the embodiment described. The write strobe 84 shown on Line #3 comes from the CPU 24 and has a rising edge 172 and a fall-ing edge 174 as shown. Line #5 shows that the old data word from memory section 26-1 (which is to be replaced by a write operation) is stored in the register 76 (FIG. 7) upon the rising edge 172 of the write strobe 84. The old data word is held by the register 76 so as to enable the Exclusive ORing (which needs to be done by the circuitry shown in FIG. 7) to be effected. After the Exclusive ORing mentioned is completed, the old data word is lost; the Exclusive ORing is completed in a time illustrated by bracket 176 in FIG. 18. The time represented by bracket 176 can never be zero, ie., it must be long enough to enable the logic circuitry shown in FIG. 7, for example, to complete its functions. In the embodiment described, the time delay represented by bracket 176 is not more than a couple hundred nanoseconds; however, if less of a time delay is desired, high speed logic gates such as emitter coupled logic gates may be used instead of the slower, less-expensive, TTO logic gates mentioned earlier herein. With such high speed logic gates, the write cycle may be almost transparent to the error checking circuit 22, for example, shown in FIG. 5. Line #4 shows that a CP word is accessed from the memory section 26-3 during the time that the line is at a high level. Line #6 shows when a CP word is written into the memory section 26-3, and similarly, line #7 shows when a data word is placed in the memory section 26-1. In other words, the CP word and the data word are written into their associated memory sections 26-3 and 26-1, respectively, almost simultaneously.

To review, some of the advantages of this invention are as follows. A user of this invention can tailor it to fit his particular needs. For example, if recovery time is not important, the block sizes as described in relation to FIG. 3 may be made quite large; this means that the memory section 26-3 for the CP words will be very small. If recovery time is important, the block sizes can be made quite small which will, of course, increase the size of the memory section 26-3 for the CP words. Another consideration is that if few errors in data are anticipated, and if recovery time is not critical, the Exclusive ORing functions discussed earlier herein may be effected by software alone or by various combinations of software and hardware.

I claim:

1. An error detection and correction system comprising:

means for storing data including a first section, said data being stored in said first section in rows and columns, with a predetermined number of said rows of data forming a block in said first section;

first means for generating and storing first check bits for said rows of data; and error correcting means, including:

second means for generating check bits for said columns of data so as to produce a check word for each said block;

a second section for storing said check words; and processor means operatively coupling said first and second means with said first and second sections;

said processor means including:

means for detecting an error in one of said rows as indicated by the associated said first check bit with the row containing an error being referred to as an error row;

third means for generating a new check word for all said rows of data except said error row in the associated said block when an error row is found by said detecting means; and means for Exclusive ORing said new check word with the said check word for said block to thereby obtain corrected data for said error row.

2. The error detection and correction system as claimed in claim 1 in which said processor means further comprises:

a first plurality of Exclusive OR gates to Exclusive OR a new row of data (which is to be written into a selected said row in a selected said block) with the row of data which is to be replaced by said new row of data to thereby produce an intermediate check word for said selected block;

a second plurality of Exclusive OR gates to Exclusive OR said intermediate check word with said check word associated with said selected block to produce a revised said check word; and means for writing said revised check word in said second section for said selected block.

3. The error detection and correction system as claimed in claim 2 in which said processor means further comprises:

a register for storing said row of data which is to be replaced by said new row of data to enable the Exclusive ORing at said first plurality of Exclusive OR gates to be effected.

4. The error detection and correction system as claimed in claim 3 in which said writing means includes a multiplexer having first and second states to enable said revised check word from second plurality of Exclusive OR gates to be written in said second section when said multiplexer is in said first state, and to enable said processor means to write into said second section when said multiplexer is in said second state.

5. A method of detecting and correcting errors in a memory, comprising the steps:

(a) dividing said memory into a predetermined number of blocks, with data being stored in rows and columns in each said block;

(b) calculating a first check bit for each said row of data;

(c) calculating a second check bit for each of said columns of data in a said block to form a check word for each said block;

(d) using said first check to detect an error in one of said rows of data within a said block; and (e) using the associated said said check word for the associated said block containing said error to correct any errors which exist in said row of data containing said error;

said step (e) comprising the steps:

(e-1) generating a new check word for all said rows of data except said row of data containing said error (hereinafter called error row) in the associated said block in which said error row is located by Exclusive ORing all said rows of data except said error row, and (e-2) Exclusive ORing said new check word with the associated said check word for said block containing said error row to thereby obtain corrected data for the entire said error row.

6. The method as claimed in claim 5 in which said step (c) comprises, during a writing operation in which a revised row of data is to be written into memory, the steps:
- (c-1) Exclusive ORing said revised row of data with said row of data in memory which is to be changed to produce an intermediate check word for the associated said block containing said row of data which is to be changed;
- (c-2) Exclusive ORing said intermediate check word with said check word for the associated said block containing said row of data in memory which is to be changed to produce a revised check word.

7. The method as claimed in claim 6 in which said step (c-1) is effected by a first plurality of Exclusive OR gates and in which said step (c-2) is effected by a second plurality of Exclusive OR gates.

8. The method as claimed in claim 6 in which said step (c) further comprises the step:
- (c-3) writing said revised row of data into its associated said block in memory and substantially simultaneously writing said revised check word into an associated memory section.

* * * * *